(12) United States Patent
Barrick

(10) Patent No.: US 6,895,454 B2
(45) Date of Patent: May 17, 2005

(54) METHOD AND APPARATUS FOR SHARING RESOURCES BETWEEN DIFFERENT QUEUE TYPES

(75) Inventor: Brian David Barrick, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 09/981,879

(22) Filed: Oct. 18, 2001

(65) Prior Publication Data

US 2003/0079068 A1 Apr. 24, 2003

(51) Int. Cl.⁷ .................................................. G06F 3/00
(52) U.S. Cl. .......................... 710/54; 710/52; 710/55; 711/147; 711/150; 711/151; 711/200
(58) Field of Search .............. 710/52–57; 711/147–158, 711/200

(56) References Cited

U.S. PATENT DOCUMENTS

| | | | |
|---|---|---|---|
| 6,694,410 B1 * | 2/2004 | Dang | 711/147 |
| 6,735,677 B1 * | 5/2004 | Stewart | 711/158 |
| 6,738,888 B2 * | 5/2004 | Chauvel | 711/207 |

* cited by examiner

*Primary Examiner*—Jeffrey Gaffin
*Assistant Examiner*—Mike Nguyen
(74) *Attorney, Agent, or Firm*—Carr LLP; Robert M. Carwell

(57) ABSTRACT

A method and an apparatus for sharing a request queue between two or more destinations. The method and apparatus utilizes a common data table and a common age queue. The age queue is used to select the oldest request. The corresponding request from the common data table is then extracted and sent to the appropriate destination.

9 Claims, 5 Drawing Sheets

METHOD AND APPARATUS FOR SHARING RESOURCES BETWEEN DIFFERENT QUEUE TYPES

BACKGROUND OF THE INVENTION

1. Field of the Invention

The invention relates generally to computer architectures and, more particularly, to a method and an apparatus for queuing requests from one or more sources to two or more destinations.

2. Description of Related Art

Queues are generally used in computer architectures to provide a buffer of input and/or output data. Devices, also referred to as destinations, such as memory, disk drives, controllers, and the like, typically have a queue that comprises requests for data and/or instructions. A requester, such as a Central Processing Unit (CPU), ports of a CPU, Algorithm Logic Unit (ALU), and the like, submits requests for data and/or instructions. The requests are temporarily stored in a queue, and as the device becomes available, a request is taken from the queue, usually on a First-In-First-Out (FIFO) basis, or some other priority scheme, and submitted to the destination, i.e., the device.

Generally, each device, or group of devices, has its own queue. Requiring each device to have a separate queue, however, requires additional resources to store and manage the queue.

Therefore, there is a need for a method and a system to efficiently manage the queuing of requests for multiple destinations.

SUMMARY

The present invention provides a method and an apparatus for queuing one or more requests to two or more destinations. The method and apparatus utilizes a data table to temporarily store the requests. An age queue is used to select the oldest element for a particular destination. Upon selection of the oldest element from the age queue, the corresponding request from the data table is issued to the destination.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning physical implementation and the like have been omitted inasmuch as such details are not considered necessary to obtain a complete understanding of the present invention, and are considered to be within the skills of persons of ordinary skill in the relevant art.

It is further noted that, unless indicated otherwise, all functions described herein may be performed in either hardware or software, or some combination thereof. In a preferred embodiment, however, the functions are implemented in hardware in order to provide the most efficient implementation. Alternatively, the functions may be performed by a processor such as a computer or an electronic data processor in accordance with code such as computer program code, software, and/or integrated circuits that are coded to perform such functions, unless indicated otherwise.

Figure 1:
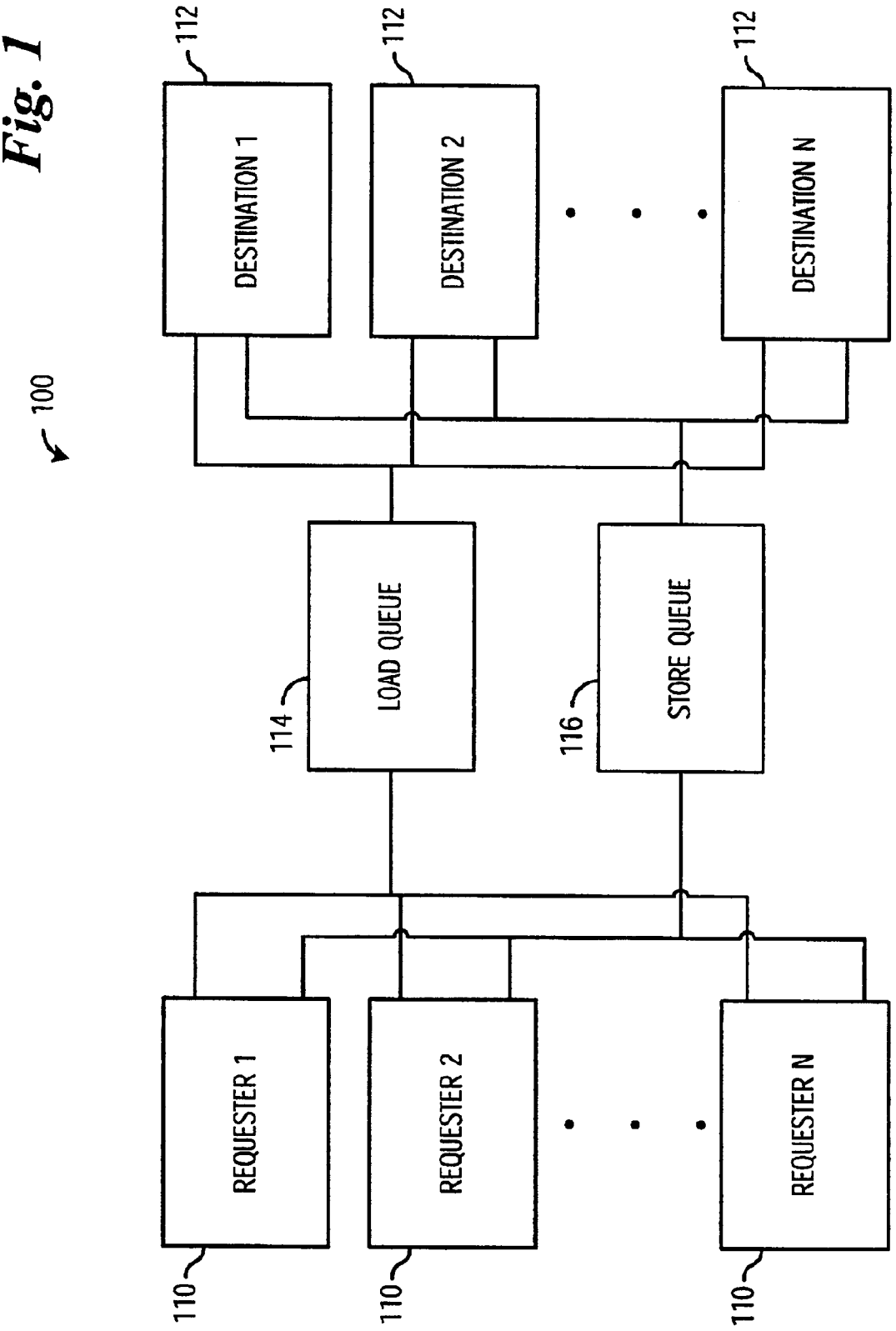
FIG. 1 is a schematic diagram of a typical network environment that embodies features of the present invention.

Referring to FIG. 1 of the drawings, the reference numeral 100 generally designates a computer architecture embodying features of the present invention. The computer architecture 100 generally comprises one or more requesters 110, such as CPUs, ALUs, one or more ports of a requestor, and/or the like, configured to request the fetching of instructions and/or data from, and/or the storing of data to, one or more destinations 112, such as memory, disks, hard drives, CD-ROMS, or the like. One or more queues, such as a load queue 114 and a store queue 116, are configured to receive and temporarily store the requests. As the devices, i.e., the destinations 112, become available, the load queue 114 and the store queue 116 provide the next request to be performed, typically in a first-in, first-out (FIFO) basis.

The load queue 114 is preferably configured to accept requests for retrieving or fetching instructions and/or data. The store queue 116 is preferably configured to accept requests for storing data in memory or in some other device. It should be noted that only one of the queues 114, 116, or additional queues, such as queues servicing a subset of devices, a group of devices, devices of a particular type, or the like, may be implemented based on the requirements of the application, and, therefore, is to be included within the scope of the present invention. The size of each of the load queue 114 and the store queue 116 is dependent upon the application, the available resources, the speed of the requests being generated, the speed of requests being serviced, and the like. Preferably, the size of each of the load queue 114 and the store queue 116 is less than the combined total of the required size of independent queues, providing additional efficiencies.

The following discusses the present invention in terms of the load queue 114 and the store queue 116 providing request queues for a cacheable destination and a non-cacheable destination. These embodiments are for the purpose of providing an example to better illustrate the features of the present invention, and, therefore, should not be construed as limiting the present invention in any manner. The cacheable and non-cacheable destinations may be any destination, commonly referred to as threads, and/or additional destinations that may exist. The use of the present invention in other configurations is considered obvious to one of ordinary skill in the art upon a reading of the present disclosure.

Figure 2:
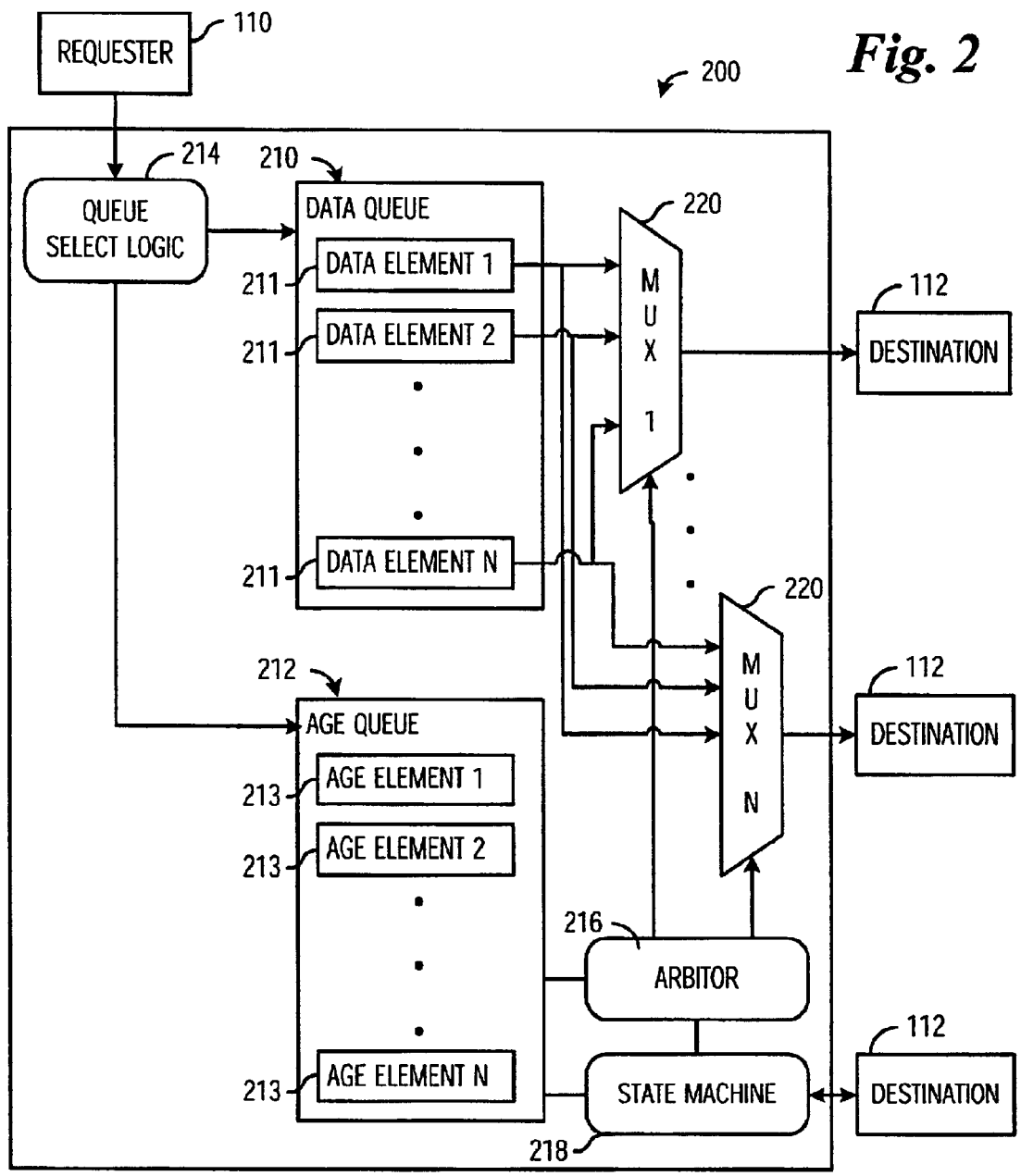
FIG. 2 is a block diagram illustrating one embodiment of the present invention in which a data queue and an age queue is used to queue requests to one or more destinations.

FIG. 2 schematically depicts a queuing system 200 that may be used by the computer architecture 100 in accordance with one embodiment of the present invention to implement a request queue, such as the load queue 114, the store queue 116, or the like. The queuing system 200 generally comprises a data queue 210 and an age queue 212. The data queue 210 preferably comprises one or more data elements 211, each data element 211 being one or more requests by a requester 110 for data and/or instructions from one or more destinations 112. The ordering of the data elements is preferably constant, e.g., a request placed in a data element 211 will always be located in the same relative location. In a preferred embodiment, however, such as a CPU requesting data from cacheable and/or non-cacheable destinations, the data queue 210 is of sufficient size to store requests received until the requester 110 can be notified that the data queue 210 is full.

The age queue 212 is preferably a queue that represents the order the requests stored in the data queue 210 were received, the destination of the request, and an indication of the status of the request. Preferably, the age queue 212 comprises age elements 213 in number substantially equal to the number of data elements 211 in the data queue 210. Furthermore, the age queue 212 is preferably implemented as essentially a First-In, First-Out (FIFO) queue, i.e, ordered based on the age of the request. Other implementations, such as a linked list or the like, may be utilized as long as the relative age is determinable. The preferred contents of the age element 213 are discussed below with reference to FIG. 3.

A queue select logic component 214 is configured to receive requests and to place the requests in the data queue 210 and the age queue 212. The process performed by the queue select logic is described in further detail below with reference to FIG. 4.

An arbiter 216 is configured to select for each destination, or thread, the oldest age element 213 and to control one or more multiplexers (MUX) 220. Preferably, there is one multiplex 220 for each destination 112. Each multiplex 220 is preferably configured to have access to all data elements 211, and to select the data element 211 to be latched to the destination 112 as specified by the arbiter 216. Furthermore, the arbiter 216 is configured to also provide a state machine 218 with the oldest age element 213. The state machine 218 is configured to provide control information to the destination 112 and to maintain the age queue 212 as described below with reference to FIGS. 3–7.

Figure 3:
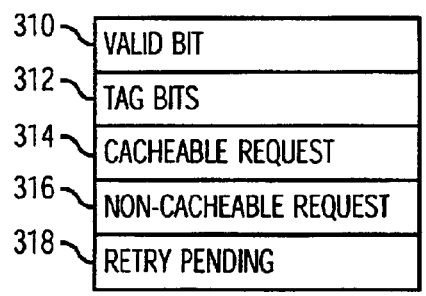
FIG. 3 is a schematic diagram of an element of the age queue that embodies features of the present invention.

FIG. 3 graphically illustrates the preferred contents of the age elements 213 of FIG. 2. Specifically, the age element 213 preferably comprises a valid bit 310, tag bits 312, one or more bits indicating the destination such as the valid cacheable request bit 314 and the valid non-cacheable request bit 316, and a retry pending bit 318. The valid bit 310 indicates whether the request has been serviced, the tag bits indicates the location of the data element 211 corresponding a particular age element 213, the cacheable request bit 314 and the non-cacheable request bit 316 indicate the destination of the request, and the retry pending bit 318 indicates whether the request has been tried and rejected by the destination 112. The preferred operation and functioning of these bits will be described below with reference to FIGS. 4–7.

Figure 4:
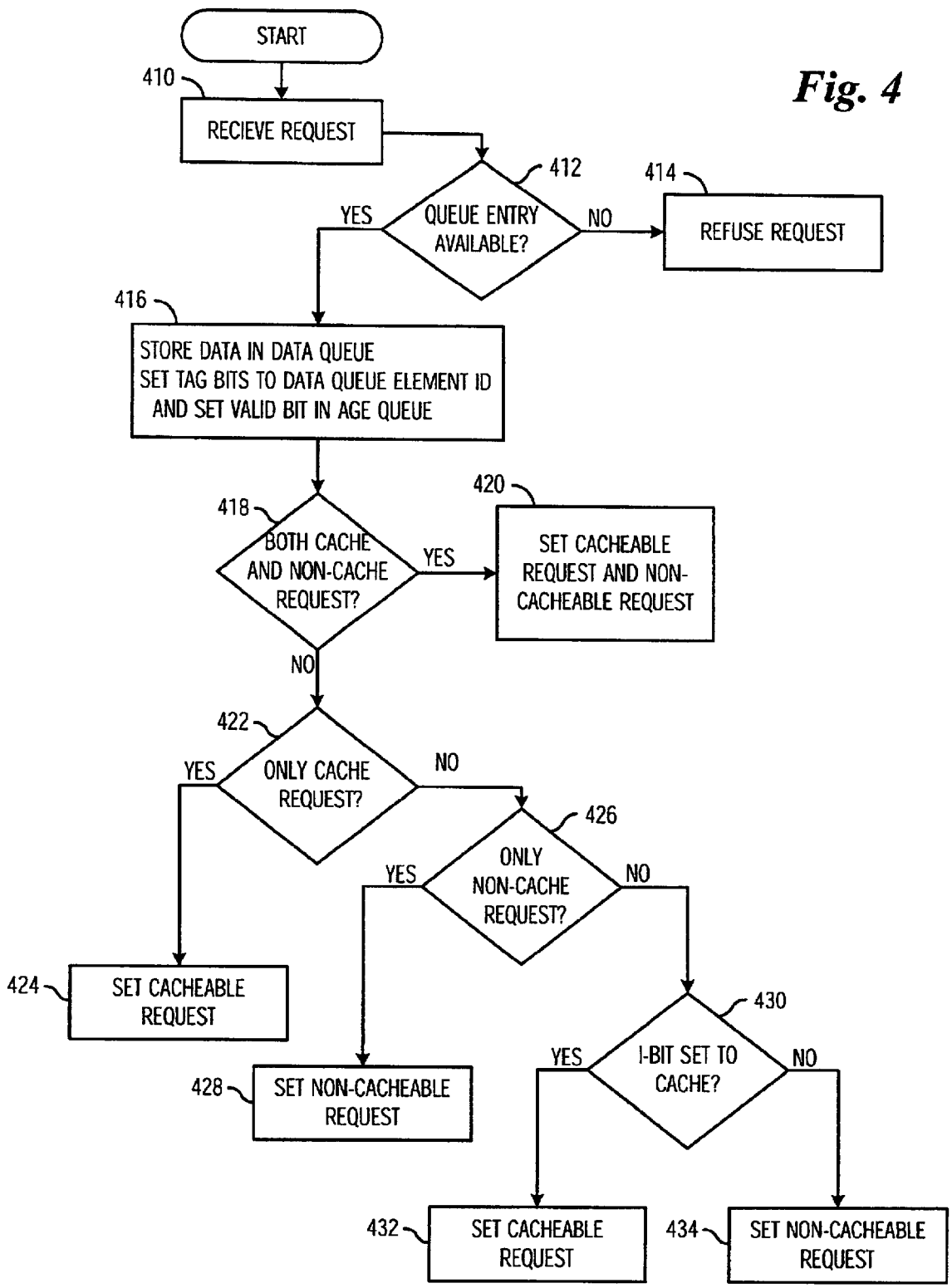
FIG. 4 is a data flow diagram illustrating one embodiment of the present invention in which requests are placed in a queue.

FIG. 4 is a flow chart depicting steps that may be performed by the queue select logic 214 in the course of one embodiment of the present invention to place requests for data and/or instructions into queue to be processed by one or more destinations 112. Accordingly, in step 410 the queue select logic receives a request for data and/or instructions. Upon receipt of the request, processing proceeds to step 412, wherein a determination is made whether there is an available data element 211. If a determination is made that a data element 211 is not available, then processing proceeds to step 414, wherein the request is refused. If, however, in step 412, a determination is made that a data element 211 is available, then processing proceeds to step 416, wherein the data queue 210 and the age queue 212 is updated to reflect the new request. Preferably, the request is stored in the available data element 211. The valid bit 310 of the age queue 212 is set to indicate a new request to be executed. The tag bits 312 of the age queue 212 are set to identify the data element 211 of the data queue 210 that corresponds to the data element in which the request was stored.

Processing then proceeds to steps 418–434, wherein determinations are made as to which thread and/or destination the request belongs. In the present example, the threads and/or destinations refer to a cacheable destination and a non-cacheable destination. Accordingly, in step 418, a determination is made whether the request is both a cacheable request and a non-cacheable request, i.e., the request is to be issued to both a cacheable destination and a non-cacheable destination, such as synchronization operation and the like. If a determination is made that the request is both a cacheable and a non-cacheable request, then processing proceeds to step 420, wherein the cacheable request bit 314 and the non-cacheable request bit 316 are set.

If, in step 418, a determination is made that the request is not both a cacheable request and a non-cacheable request, then processing proceeds to step 422, wherein a determination is made whether the request is only a cacheable request, such as a load operation to cacheable memory, a store operation to cacheable memory, or the like. If a determination is made that the request is only a cacheable request, then processing proceeds to step 424, wherein the cacheable request bit is set.

If, in step 422, a determination is made that the request is not only a cacheable request, then processing proceeds to step 426, wherein a determination is made whether the request is only a non-cacheable request, such as a load operation to non-cacheable memory/device, a store operation to non-cacheable memory/device, or the like. If a determination is made that the request is only a non-cacheable request, then processing proceeds to step 428, wherein the non-cacheable request bit 316 is set.

If, in step 426, a determination is made that the request is not only a non-cacheable request, then processing proceeds to step 430, wherein a determination is made whether the request contains an indication of the destination. Preferably, the request contains one or more bits, such as the cache inhibited bit (i-bit) contained in the PowerPC architecture defined by IBM, Corp., Apple Computers, Inc., and Motorola, Inc., that indicate the type of destination of the request. In the present example, a single bit may be used to indicate cacheable (the i-bit is not set) or non-cacheable (the i-bit is set). If a determination is made that the request is cacheable, then processing proceeds to step 432, wherein the cacheable request bit 314 is set. If, in step 430 a determination is made that the request is not a cacheable request, i.e., it is a non-cacheable request, then processing proceeds to step 434, wherein the non-cacheable request bit 316 is set.

Figure 5:
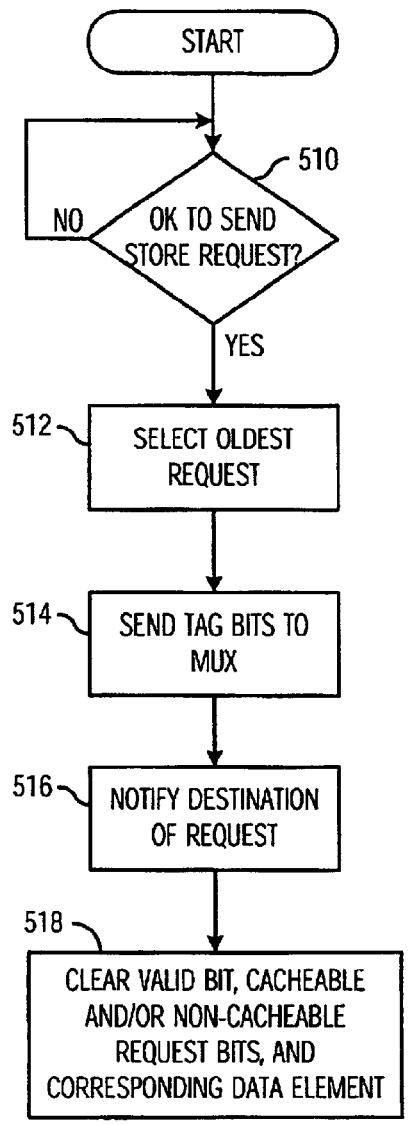
FIG. 5 is a data flow diagram illustrating one embodiment of the present invention in which a store request is removed from the queues and submitted to a destination.

FIG. 5 is a flow chart depicting steps that may be performed by the computer architecture 100 for each type of destination in accordance with one embodiment of the present invention that selects the oldest element in the age queue 212 (FIG. 2) for a store operation. Processing begins in step 510, wherein a determination is made whether the destination is prepared to accept a request. The status of the destination may be determined by any suitable means, such as maintaining a count of operations, handshaking, and/or the like.

If, in step 510, a determination is made that the destination is not prepared to accept a request, then processing waits, i.e., no store requests are sent to the destination, until the destination indicates that the destination is prepared to accept a store request. If, however, in step 510, a determination is made that the destination is prepared to accept a store request, then processing proceeds to step 512, wherein the oldest store request is selected from the age queue 212. In step 514, the arbiter 216 extracts the tag bits 312 and sends the tag bits 312 to the mux 220, which latches the data element 211 identified by the tag bits 312 through to the destination. In step 516, the destination is notified, preferably by the state machine, that a new request is available. In step 518, the valid bit 310 and the cacheable/non-cacheable request bits 314, 316 are reset and the corresponding data element 211 is reallocated.

Figure 6:
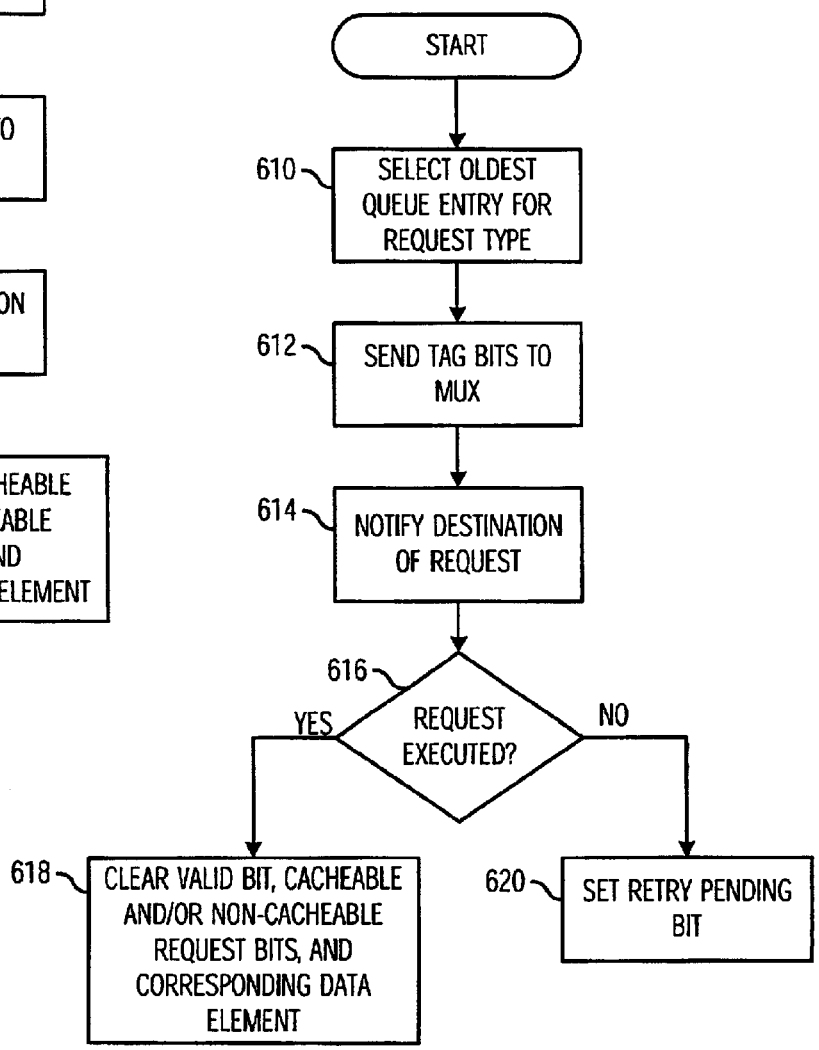
FIG. 6 is a data flow diagram illustrating one embodiment of the present invention in which a load request is removed from the queues and submitted to a destination.

FIG. 6 is a flow chart depicting steps that may be performed by the computer architecture 100 for each type of destination in accordance with one embodiment of the present invention that selects the oldest element in the age queue 212 (FIG. 2) that is not suspended, i.e., the retry pending bit 318 is not set, for a load operation. Processing begins in step 610, wherein the oldest entry in the age queue 212 is selected.

In step 612, the arbiter 216 extracts the tag bits 312 to send to the mux 220, which latches the data element 211 identified by the tag bits 312 through to the destination. In step 614, the destination is notified, preferably by the state machine 218, that a new request is available. In step 616, a determination is made whether the request has been accepted and executed by the destination. If a determination is made that the request has been accepted and executed by the destination, then processing proceeds to step 618, wherein the valid bit 310 is reset and the data element 211 is reallocated.

If, in step 616, a determination is made that the request has not been executed, then processing proceeds to step 620, wherein the retry pending bit 318 is set to indicate that the request has yet to be executed. In some circumstances, such as when the destination is busy, there is arbitration failure, the destination is accepting only specific operations and/or addresses, or the like, the destination will not execute the request. In these situations, it is preferable that the request be suspended and retried at a later time. Preferably, the request remains suspended until the retry pending bit 318 is reset, as described below with reference to FIG. 7.

Figure 7:
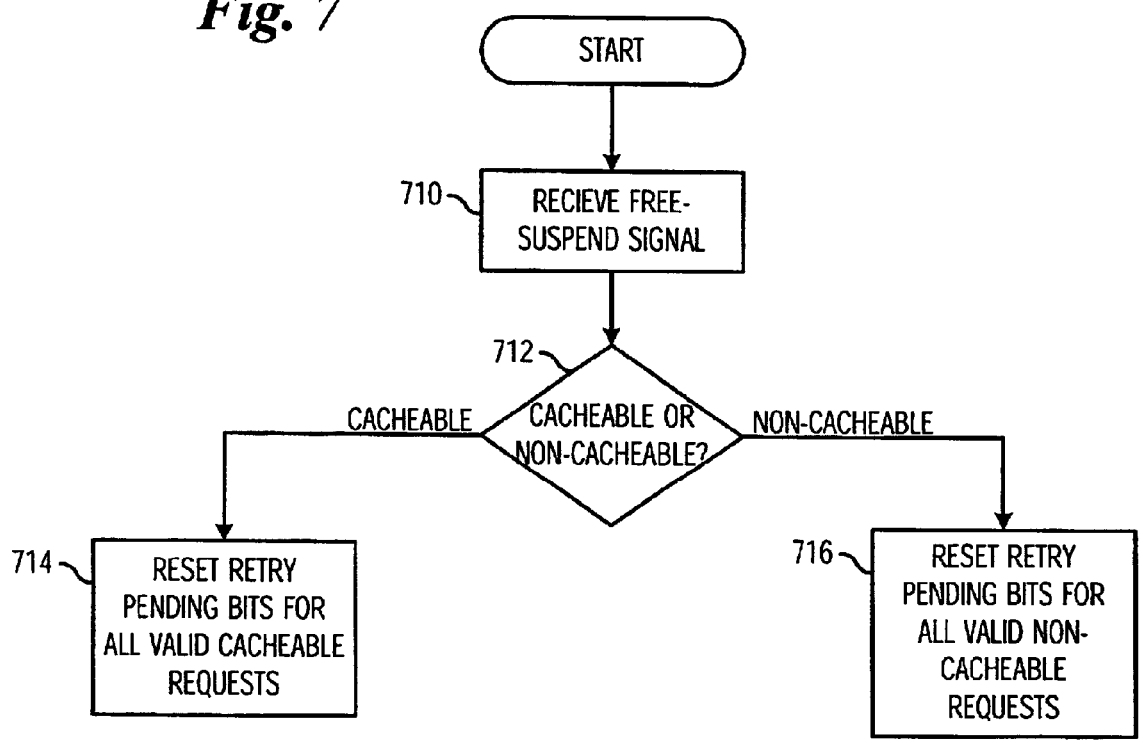
FIG. 7 is a data flow diagram illustrating one embodiment of the present invention in which a free-suspend signal is received.

FIG. 7 is a flow chart depicting steps that may be performed by the computer architecture 100 for each type of destination in accordance with one embodiment of the present invention that resets the retry pending bit 318 of a suspended load operation as described above with reference to step 620 (FIG. 6). More particularly, if a load operation was not performed and the retry pending bit 318 is set as determined above in step 620, the request is suspended until the retry pending bit 318 is reset as described below with reference to steps 710–716.

Accordingly, processing begins in step 710, wherein a command or signal, such as a free-suspend signal, is received from the destination. Upon receipt of the free-suspend signal, processing proceeds to step 712, wherein a determination is made from which destination the free-suspend signal was received. Preferably, the free-suspend signal comprises one or more bits that indicate the destination, i.e., the source of the free-suspend signal. In the instant case, a single bit may be used to indicate the destination as either the cacheable destination or the non-cacheable destination.

If, in step 712, a determination is made that the free-suspend signal was received from the cacheable destination, then processing proceeds to step 714, wherein the retry pending bit 318 is reset for all valid cacheable requests. If, however, in step 712, a determination is made that the free-suspend signal was received from the non-cacheable destination, then processing proceeds to step 716, wherein the retry pending bit 318 is reset for all valid non-cacheable requests. Thereafter, the requests may be processed as described above with reference to FIGS. 5 and 6.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A method of queuing requests from one or more requestors to two or more destinations, the method comprising the steps of:

providing an age queue and a data queue;

receiving one or more requests for one or more of the two or more destinations;

determining whether the data queue contains an available location; and upon a determination that the data queue contains an available location, performing the substeps of:

storing the one or more requests in the data queue; and storing identifying information in an age queue element of the age queue, the identifying information comprising a tag that identifies the location of the one or more requests in the data queue.

2. A method of providing requests from one or more requestors to a first destination and a second destination, the method comprising the steps of:

providing an age queue and a data queue;

receiving one or more requests;

determining whether the data queue contains an available location;

upon a determination that the data queue contains an available location, performing the substeps of:

storing the one or more requests in the data queue; and storing identifying information in an age queue element of the age queue, the identifying information comprising a tag that identifies the location of the corresponding element in the data queue;

determining a first oldest element in the age queue corresponding to a first request for the first destination;

submitting to the first destination the first request in the data queue identified by the tag included in the first oldest element;

determining a second oldest element in the age queue corresponding to a second request for the second destination; and submitting to the second destination the second request in the data queue identified by the tag included in the second oldest element.

3. A method of providing requests from one or more requestors to two or more destinations, the method comprising the steps of:

providing an age queue and a data queue;

receiving one or more requests for at least one of two or more destinations;

storing the one or more requests in the data queue;

storing for each of the one or more requests an age queue element in the age queue, each age queue element comprising a tag that indicates the location of the corresponding request in the data queue and an indication from which of the two or more destinations the request is to be made;

determining for each destination the oldest age queue element; and submitting from the data queue the request corresponding to the tag contained in the oldest age queue element.

4. An apparatus for queuing requests from one or more requestors to two or more destinations, the apparatus comprising:

an age queue;

a data queue;

means for receiving one or more requests for one or more of the two or more destinations;

means for determining whether the data queue contains an available location; and means for, upon a determination that the data queue contains an available location, storing the one or more requests in the data queue, and storing identifying information in an age queue element of the age queue, the identifying information comprising a tag that identifies the location of the one or more requests in the data queue.

5. An apparatus for providing requests from one or more requestors to a first destination and a second destination, the apparatus comprising:

an age queue;

a data queue;

means for receiving one or more requests;

means for determining whether the data queue contains an available location;

means for, upon a determination that the data queue contains an available location, storing the one or more requests in the data queue, and storing identifying information in an age queue element of the age queue, the identifying information comprising a tag that identifies the location of the corresponding element in the data queue;

means for determining a first oldest element in the age queue corresponding to a first request for the first destination;

means for submitting to the first destination the first request in the data queue identified by the tag included in the first oldest element;

means for determining a second oldest element in the age queue corresponding to a second request for the second destination; and means for submitting to the second destination the second request in the data queue identified by the tag included in the second oldest element.

6. An apparatus for providing requests from one or more requestors to two or more destinations, the apparatus comprising:

an age queue;

a data queue;

means for receiving one or more requests for at least one of two or more destinations;

means for storing the one or more requests in the data queue;

means for storing for each of the one or more requests an age queue element in the age queue, each age queue element comprising a tag that indicates the location of the corresponding request in the data queue and an indication from which of the two or more destinations the request is to be made;

means for determining for each destination the oldest age queue element; and means for submitting from the data queue the request corresponding to the tag contained in the oldest age queue element.

7. A computer program product for queuing requests from one or more requestors to two or more destinations, the computer program product having a medium with a computer program embodied thereon, the computer program comprising:

computer code for providing an age queue and a data queue;

computer program code for receiving one or more requests for one or more of the two or more destinations;

computer program code for determining whether the data queue contains an available location; and computer program code for, upon a determination that the data queue contains an available location, storing the one or more requests in the data queue, and storing identifying information in an age queue element of the age queue, the identifying information comprising a tag that identifies the location of the one or more requests in the data queue.

8. A computer program product for providing requests from one or more requestors to a first destination and a second destination, the computer program product having a medium with a computer program embodied thereon, the computer program comprising:

computer code for providing an age queue and a data queue;

computer program code for receiving one or more requests;

computer program code for determining whether the data queue contains an available location;

computer program code for, upon a determination that the data queue contains an available location, storing the one or more requests in the data queue, and storing identifying information in an age queue element of the age queue, the identifying information comprising a tag that identifies the location of the corresponding element in the data queue;

computer program code for determining a first oldest element in the age queue corresponding to a first request for the first destination;

computer program code for submitting to the first destination the first request in the data queue identified by the tag included in the first oldest element;

computer program code for determining a second oldest element in the age queue corresponding to a second request for the second destination; and computer program code for submitting to the second destination the second request in the data queue identified by the tag included in the second oldest element.

9. A computer program product for providing requests from one or more requestors to two or more destinations, the computer program product having a medium with a computer program embodied thereon, the computer program comprising:

computer code for providing an age queue and a data queue;

computer program code for receiving one or more requests for at least one of two or more destinations;

computer program code for storing the one or more requests in the data queue;

computer program code for storing for each of the one or more requests an age queue element in the age queue, each age queue element comprising a tag that indicates the location of the corresponding request in the data queue and an indication from which of the two or more destinations the request is to be made;

computer program code for determining for each destination the oldest age queue element; and computer program code for submitting from the data queue the request corresponding to the tag contained in the oldest age queue element.

* * * * *